(12) United States Patent
Moon et al.

(10) Patent No.: US 9,825,791 B2
(45) Date of Patent: Nov. 21, 2017

(54) METHOD AND DEVICE FOR RECEIVING FREQUENCY-SHIFT KEYING SIGNAL

(71) Applicant: ABOV SEMICONDUCTOR CO., LTD., Cheongju, Chungcheongbuk-do (KR)

(72) Inventors: Ki Tae Moon, Seoul (KR); Sang Young Chu, Gyeonggi-do (KR); Suk Kyun Hong, Seoul (KR)

(73) Assignee: ABOV SEMICONDUCTOR CO., LTD., Cheongju, Chungcheongbuk-do (KR)

( * ) Notice: Subject to any disclaimer, the term of this patent is extended or adjusted under 35 U.S.C. 154(b) by 0 days.

(21) Appl. No.: 15/390,280

(22) Filed: Dec. 23, 2016

(65) Prior Publication Data

US 2017/0195149 A1 Jul. 6, 2017

(30) Foreign Application Priority Data

Dec. 30, 2015 (KR) ........................ 10-2015-0189344

(51) Int. Cl.
*H04L 27/14* (2006.01)
*H04B 7/26* (2006.01)
*H04L 1/00* (2006.01)

(52) U.S. Cl.
CPC .............. *H04L 27/14* (2013.01); *H04B 7/26* (2013.01); *H04L 1/0054* (2013.01)

(58) Field of Classification Search
CPC .......... H04L 27/14; H04L 1/0054; H04B 7/26
See application file for complete search history.

(56) References Cited

U.S. PATENT DOCUMENTS

| 5,514,998 A * | 5/1996 | Kim ................... H04L 27/2332 329/300 |
| 6,487,240 B1 | 11/2002 | Chen |
| 6,642,797 B1 | 11/2003 | Luo et al. |
| 6,728,301 B1 * | 4/2004 | Chrisikos ............. H04B 1/7087 375/130 |
| 6,751,273 B1 | 6/2004 | Park et al. |
| 6,973,142 B2 | 12/2005 | Chen et al. |

(Continued)

FOREIGN PATENT DOCUMENTS

| JP | 2006-109476 A | 4/2006 |
| JP | 4383445 B2 | 12/2009 |

(Continued)

*Primary Examiner* — Syed Haider
(74) *Attorney, Agent, or Firm* — Mintz Levin Cohn Ferris Glovsky and Popeo, P.C.; Kongsik Kim; Colleen H. Witherell

(57) ABSTRACT

Disclosed are a method and device for receiving a frequency-shift keying signal. The device for receiving a frequency-shift keying signal includes a front-end circuit, complex differential discriminators, and a recovery circuit. The front-end circuit receives a signal transmitted via a frequency-shift keying channel, and generates the baseband signal of the received signal. The complex differential discriminators have a plurality of orders and use the complex conjugate of the baseband signal of the received signal. The recovery circuit recovers symbols by applying a maximum likelihood sequence estimation (MLSE) technique to the output values of the complex differential discriminators having the plurality of orders.

14 Claims, 9 Drawing Sheets

(56) References Cited

U.S. PATENT DOCUMENTS

| | | | |
|---|---|---|---|
| 7,376,207 | B2 | 5/2008 | Chen |
| 7,570,717 | B2 | 8/2009 | Kim et al. |
| 7,639,762 | B2 | 12/2009 | Weizhong |
| 7,664,205 | B2 | 2/2010 | Wang et al. |
| 8,401,120 | B1 | 3/2013 | Ozgur |
| 8,411,797 | B2 | 4/2013 | Suissa et al. |
| 8,478,136 | B2 | 7/2013 | Hayee et al. |
| 8,903,023 | B1 | 12/2014 | Wang et al. |
| 9,571,314 | B1 * | 2/2017 | Yang ........................ H04L 27/14 |
| 2002/0057746 | A1 * | 5/2002 | Chen ................. H04L 25/03178 375/334 |
| 2013/0272722 | A1 | 10/2013 | Hayee et al. |

FOREIGN PATENT DOCUMENTS

| | | |
|---|---|---|
| JP | 2011-166209 A | 8/2011 |
| JP | 5454181 B2 | 3/2014 |
| KR | 2001-0100573 A | 11/2001 |
| KR | 10-0339661 B1 | 5/2002 |
| KR | 10-0525002 B1 | 10/2005 |
| KR | 10-0544245 B1 | 1/2006 |
| KR | 2010-0035726 A | 4/2010 |
| KR | 10-1000861 B1 | 12/2010 |
| KR | 10-1026407 B1 | 4/2011 |

\* cited by examiner

METHOD AND DEVICE FOR RECEIVING FREQUENCY-SHIFT KEYING SIGNAL

CROSS-REFERENCE TO RELATED APPLICATION

This application claims under 35 U.S.C. §119(a) the benefit of Korean Patent Application No. 10-2015-0189344 filed on Dec. 30, 2015, which is incorporated herein by reference.

TECHNICAL FIELD

The present invention relates to technology for a method and device for receiving a FSK (frequency-shift keying) signal, and more particularly to a method and device for recovering a frequency-shift keying signal, which adopts a newly proposed differential discriminator structure that is intended to improve the sensitivity of the receiving of a frequency-shift keying signal.

The present invention was derived from the research conducted as a part of the Industrial Core Technology Development Project sponsored by the Korean Ministry of Trade, Industry and Energy and the Korea Institute of Industrial Technology Evaluation and Planning [Project Management Number: 10052626; Project Name: Development of BLE (Bluetooth Low-Energy) v4.2 Supporting Communication Semiconductor IP and Location Tracking SoC].

BACKGROUND ART

Digital wireless communication systems use many types of modulation methods in order to transmit data. Generally, in communication standards, such as Bluetooth, Wireless M-Bus and Wi-SUN, a modulation method, such as Gaussian frequency shift keying (FSK), is used. Gaussian frequency shift keying is designed to pass an input frequency-shift keying signal first through a Gaussian filter. Since the spectrum of a frequency-shift keying signal occupies a considerably wide band due to the characteristics of a frequency-modulated signal, the bandwidth of an output signal is limited to a desired level by passing the frequency-shift keying signal through the Gaussian filter. The bandwidth of a Gaussian filter is normally represented by a BT product. The Bluetooth Classic and Bluetooth Smart standards recommend the use of a Gaussian filter having a BT (BT product) value of 0.5.

Furthermore, differential discriminators that are simple to implement are chiefly used for the demodulation of Gaussian frequency-shift keying signals. In the application fields of Bluetooth Smart, the improvement of conventional differential discrimination receivers is required in order to improve receiving sensitivity or extend coverage. Research into a maximum likelihood sequence estimation (MLSE) receiver is being widely conducted in order to improve receiving sensitivity. Although the MLSE receiver has slightly high complexity, it can achieve the improvement of receiving sensitivity equal to or greater than 4 dB compared to a receiver using a conventional differential discriminator.

An example of a representative receiving method for an MLSE receiver for receiving a Gaussian frequency-shift keying signal is a method of receiving a signal by representing a GFSK signal as the sum of pulse amplitude-modulated signals via Laurent's decomposition and obtaining MLSE results through the application of the Viterbi algorithm to matched filters for the pulse amplitude-modulated signals and the output values of the matched filters. According to Laurent's decomposition, an arbitrary phase-modulated signal can be represented by using a modulation index h. Since an MLSE receiver processes a signal on the assumption that the modulation index h is a specific value, a problem arises in that it is not easy to recover a signal when the difference between an actual modulation index and the assumed value is large.

In view of the fact that variations in modulation index allowed in the Bluetooth Classic standard range from 0.28 to 0.35 and variations in modulation index allowed in the Bluetooth Smart standard range from 0.45 to 0.55, the conventional GFSK-MLSE receiver absolutely requires accurate modulation index estimation.

An example of a preceding technology for implementing an FSK-MLSE receiver in a simple form is disclosed in Korean Patent No. 10-0544245 entitled "Device for Receiving and Recovering Frequency-Shift Keyed Symbols."

FIG. 1 shows a device for receiving frequency-shift keying symbols according to the conventional technology. The device of FIG. 1 includes an antenna configured to detect a Gaussian frequency-shift keying signal from a transmitter. The signal received via the antenna is transferred to a frequency down converter 110 configured to down-convert the received signal. The frequency down converter 110 is connected to a four-order selective filter 120 to be selectively tuned to a desired channel.

The device further includes a selective filter 120 configured to selectively pass a desired channel therethrough and remove an undesired channel. To improve selectivity and the removal of an adjacent channel, the BT of the selective filter 120 is preferably designed to be about ½ of the BT of a transmitter filter (i.e., assuming that the BT of the transmitter filter is 0.5, the BT of the selective filter is 0.25). When the bandwidth of the selective filter is excessively narrow, serious interference is caused between ISI symbols, and thus compensation must be performed when symbols are recovered later. A discriminator 130 is connected to the selective filter 120, and converts received frequency domain symbols into time domain symbols. A symbol recovery processor 140 is connected to the discriminator 130, and recovers the symbols via a 2-state MLSE technique.

In this case, the conventional discriminator 130 generates a voltage signal proportional to the deviation by which the frequency of a signal deviates from the center frequency of the signal, and may have the function of converting a frequency domain signal, having a variation in the frequency domain even when it is a baseband signal, into a time domain signal.

In the conventional technology, both the selective filter 120 and the MLSE-based symbol recovery processor 140 can be easily designed in the state in which the modulation index h has been assumed. Accordingly, the conventional technology is problematic in that a reduction in performance may occur when the estimation of the modulation index h fails.

The conventional GFSK-MLSE signal recovery method is problematic in that a reduction in performance occurs inevitably due to an allowable variation in modulation index that is prescribed in the Bluetooth standard. Another problem of the conventional technology is that it is not easy to determine a modulation index via channel estimation.

SUMMARY OF THE DISCLOSURE

The present invention relates to technology for a method and device for receiving a frequency-shift keying signal. An object of the present invention is to provide a method and device for recovering a frequency-shift keying signal by applying an MLSE technique to the output values of a plurality of complex differential discriminators in order to improve receiving sensitivity without performing modulation index estimation at a receiver.

An object of the present invention is to provide an MLSE receiving and signal recovery method that is robust to variations in the modulation index of a transmitted signal.

An object of the present invention is to provide a method and device for recovering symbols by generating the baseband signal of a received signal transmitted via a frequency-shift keying channel and applying an MLSE technique to the output values of a plurality of complex differential discriminators using the complex conjugate of the generated baseband signal of the received signal.

An object of the present invention is to reduce the complexity of implementation by removing modulation index estimation from the configuration of a typical MLSE receiver for receiving a Gaussian frequency-shift keying signal.

An object of the present invention to provide a receiver that is capable of recovering symbols by applying an MLSE technique to a Gaussian frequency-shift keying signal having an arbitrary modulation index.

An object of the present invention to provide a method and device for receiving a frequency-shift keying signal, which are capable of achieving the improvement of receiving sensitivity equal to or greater than 4 dB for a Gaussian frequency-shift keying signal having an arbitrary modulation index.

An object of the present invention to provide a method and device for receiving frequency-shift keying signals, which enable Gaussian frequency-shift keying signals having different modulation indices, such as signals for Bluetooth Classic and Bluetooth Smart, to be received using the same receiver structure.

According to an aspect of the present invention, there is provided a device for receiving a frequency-shift keying signal, the device including: a front-end circuit configured to receive a signal transmitted via a frequency-shift keying channel and to generate the baseband signal of the received signal; complex differential discriminators configured to have a plurality of orders and using the complex conjugate of the baseband signal of the received signal; and a recovery circuit configured to recover symbols by applying a maximum likelihood sequence estimation (MLSE) technique to the output values of the complex differential discriminators having the plurality of orders. The plurality of complex differential discriminators may include first order, second order, . . . , N-th order complex differential discriminators. When the highest number of orders of the plurality of complex differential discriminators is N, N complex differential discriminators are provided.

The first order differential discriminator may obtain the complex conjugate of a baseband signal and the complex conjugate of a signal obtained by delaying the baseband signal by one symbol interval, and may multiply the complex conjugates. The second order differential discriminator may obtain the complex conjugate of the baseband signal and the complex conjugate signal of a signal obtained by delaying the baseband signal by two symbol intervals, and may multiply the complex conjugates. The N-th order differential discriminator may obtain the complex conjugate of the baseband signal and the complex conjugate of a signal obtained by delaying the baseband signal by N symbol intervals, and may multiply the complex conjugates.

The transmitted signal may pass through a Gaussian filter before passing through the frequency-shift keying channel.

In this case, the maximum number of orders of the complex differential discriminators may be determined in accordance with the bandwidth of the Gaussian filter. The MLSE technique may be the Viterbi algorithm, and the number of states of the Viterbi algorithm may be determined in accordance with a bandwidth of the Gaussian filter. The highest number N of orders of the plurality of complex differential discriminators to be used at the receiving device may be determined in accordance with the BT product of a GFSK Gaussian filter. Since the length of the Gaussian filter is determined in accordance with the BT product of the Gaussian filter, the highest number of orders of the plurality of complex differential discriminators may be determined in accordance with the length of the Gaussian filter.

When the length of the Gaussian filter is L, first order, second order, . . . , L-th order complex differential discriminators are required. In the cases of Bluetooth Classic and Bluetooth Smart, BT=0.5, in which case 99.999% or more of the energy of the Gaussian filter is concentrated within 3 symbols. Accordingly, when the MLSE technique is applied using first order, second order and third order complex differential discriminator output values, the performance desired by a user may be obtained.

Furthermore, the number of states of the Viterbi algorithm is also influenced by the length of the Gaussian filter. When the length of the Gaussian filter is L, the states of the Viterbi algorithm may be represented by using L−1 memories, and thus $2^{L-1}$ states are present. In the cases of Bluetooth Classic and Bluetooth Smart, the length of the Gaussian filter is 3, and thus the number of states of the Viterbi algorithm is $2^{3-1}=4$. 4 states may be constructed, and then the Viterbi algorithm may be applied.

Furthermore, the output values of the complex differential discriminators may include both real and imaginary parts. The conventional differential discriminator obtains the complex conjugates of a baseband signal and a signal obtained by delaying the baseband signal, multiplies the complex conjugates, and outputs only the real or imaginary parts of output values. In contrast, the receiving device of the present invention may use both the real and imaginary parts of the output values of the plurality of differential discriminators for the calculation of the internal branch metrics of the Viterbi algorithm. Both the real and imaginary parts of the output values of the first order, second order, . . . , N-th order complex differential discriminators may be used as the inputs of the Viterbi algorithm.

The transmitted signal may pass through a Gaussian filter before passing through the frequency-shift keying channel.

According to another aspect of the present invention, there is provided a method for receiving a frequency-shift keying signal, the method including: receiving a signal transmitted via a frequency-shift keying channel; generating the baseband signal of the received signal; generating the output values of differential discriminators having a plurality of orders and using the complex conjugate of the baseband signal of the received signal; and recovering symbols by applying a maximum likelihood sequence estimation (MLSE) technique to the output values of the complex differential discriminators.

DETAILED DESCRIPTION OF THE DISCLOSURE

Embodiments of the present invention will be described in detail with reference to the accompanying drawings. In the following description of the present invention, a detailed description of a related well-known component or function will be omitted when it is determined that the detailed description may make the gist of the present invention obscure.

The prevent invention is not limited to the embodiments. Throughout the accompanying drawings, the same reference symbols designate the same components.

Figure 2:
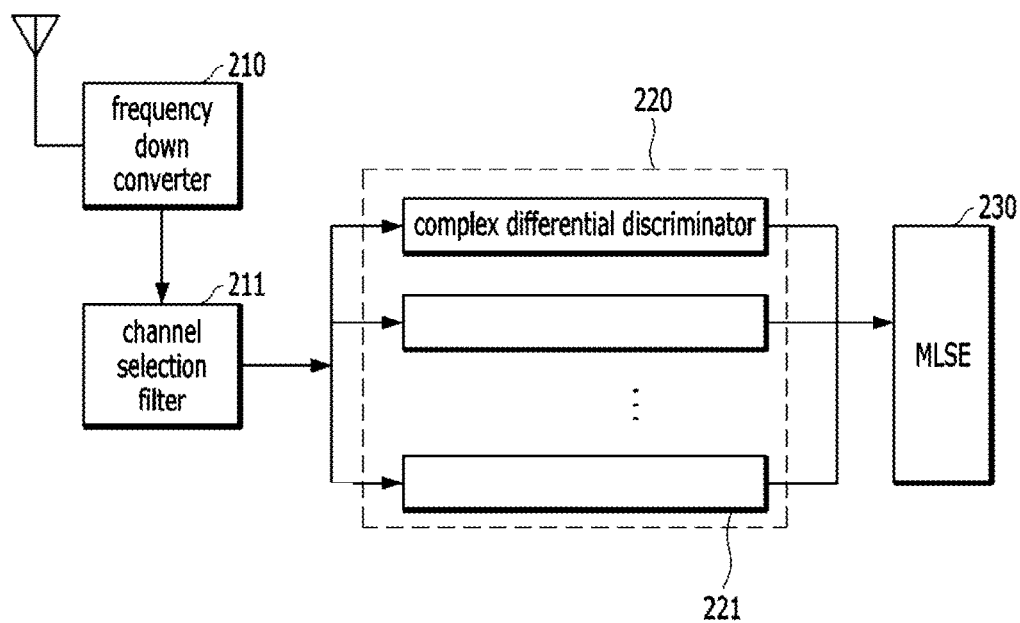
FIG. 2 is a diagram showing a device for receiving a frequency-shift keying signal according to an embodiment of the present invention.

FIG. 2 is a diagram showing a device for receiving a frequency-shift keying signal according to an embodiment of the present invention.

As shown in FIG. 2, the device for receiving a frequency-shift keying signal according to the embodiment of the present invention may provide a receiving device, robust to variations in modulation index and not requiring the estimation of a modulation index, by using the plurality of complex differential discriminators 221 of a discriminator stage 220.

The device of FIG. 2 includes an antenna configured to detect a frequency-shift keying signal from a transmitter, like a conventional receiver. The received signal detected by the antenna is transferred to a frequency down converter 210 configured to down-convert the received signal. The antenna and the frequency down converter 210 are often collectively referred to as a "front-end circuit."

Thereafter, the received signal down-converted via the frequency down converter 210 passes through a selective filter 211 and then passes through the discriminator stage 220 including the plurality of complex differential discriminators 221.

The front-end circuit receives the signal transmitted via a frequency-shift keying channel, and then generates a baseband signal by down-converting the received signal. The discriminator stage 220 including the plurality of complex differential discriminators 221 outputs first order, second order, . . . , N-th order discrimination result values by using the complex conjugate of the baseband signal of the received signal.

Each of the complex differential discriminators 221 according to the present invention may output both the real and imaginary parts of an output value, unlike the conventional complex differential discriminator. The recovery circuit 230 of FIG. 2 recovers symbols before frequency shift keying by applying an MLSE technique to the output values of the complex differential discriminators 221. In this case, the recovery circuit 230 may recover symbols in accordance with an arbitrary modulation index by using both the real and imaginary parts of the output values of the complex differential discriminators 221. The device of FIG. 2 is robust to variations in modulation index and does not require the estimation of a modulation index because the recovery circuit 230 may recover symbols in accordance with an arbitrary modulation index. Since the device of FIG. 2 does not require the estimation of a modulation index, a modulation index estimation module can be omitted in terms of hardware, thereby providing the effect of reducing manufacturing costs.

In another embodiment of the present invention, a signal having passed through a Gaussian filter before passing through a frequency-shift keying channel may be received, in which case the number of orders of the complex differential discriminators is determined in accordance with the bandwidth (BT product) of the Gaussian filter. For example, when the BT product of the Gaussian filter is 0.5, the number of orders of the complex differential discriminators is preferably 3.

In this case, the MLSE technique that is applied to the recovery circuit may be the Viterbi algorithm. Accordingly, the problem of branch metric errors that are cumulatively generated by a modulation index error can be overcome by using the outputs of the plurality of complex differential discriminators 221 of the discriminator stage 220 as the inputs of the Viterbi algorithm. In this case, the number of states of the Viterbi algorithm may be determined in accordance with the BT product of the Gaussian filter.

An example of a representative method of analyzing a signal by applying an MLSE technique to a Gaussian frequency-shift keying signal is a method of analyzing a received signal by representing a GFSK signal as the sum of pulse amplitude-modulated signals via Laurent's decomposition and obtaining MLSE results by applying the Viterbi algorithm to matched filters for the pulse amplitude-modulated signals and the output values of the matched filters.

A GFSK received signal r(t) is the baseband signal of a receiver, and is represented by Equation 1 below:

$$r(t)=e^{j\theta(t)}+n(t)=e^{j\pi h\Sigma\alpha_n g(t-nT)}+n(t) \quad (1)$$

where θ(t) is the phase of the received signal r(t), n(t) is a complex Gaussian noise signal and has a zero mean, g(t) is a phase shift function, h is a modulation index, $\alpha_n$ is the transmitted data of an n-th bit stream, and T is bit duration.

According to Laurent's decomposition, when the length of the phase shift function g(t) is L, a GFSK signal is the sum of $2^{L-1}$ pulse amplitude-modulated signals and is represented by Equation 2 below:

$$r(t) = \sum_{k=0}^{2^{L-1}-1} \sum_{n} a_{k,n} h_k(t-nT) + n(t) \quad (2)$$

where $a_{k,n}$ is the n-th bit stream of a k-th pulse amplitude-modulated signal, and $h_k(t)$ is a function indicative of the k-th pulse amplitude-modulated signal and represents the waveform of the finite non-zero interval of a pulse.

Prior to the analysis of the signal of the receiving device according to the present invention, the signal analysis method of a conventional MLSE receiving device is introduced for ease of description below. As a conventional technology contrasted with the present invention, the GFSK-MLSE receiver of FIG. 9 is illustrated.

Figure 1:
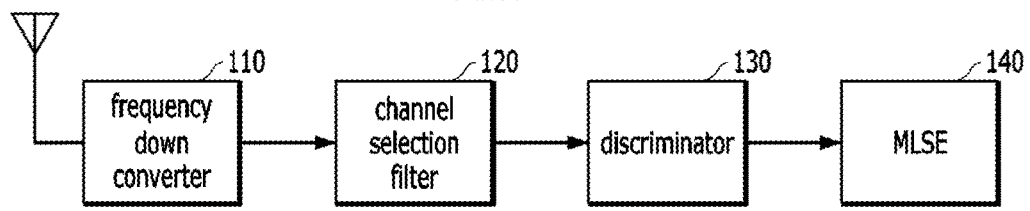
FIG. 1 is a diagram showing a conventional device for receiving frequency-shift keying symbols.
Figure 9:
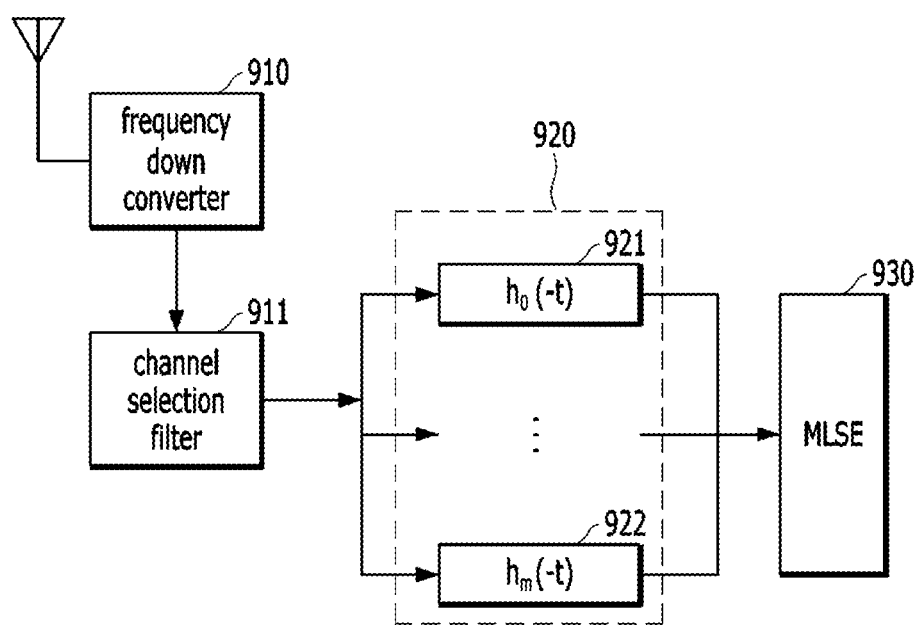
FIG. 9 is a diagram showing a conventional MLSE receiver for receiving a Gaussian frequency-shift keying signal.

Referring to FIG. 9, the conventional GFSK-MLSE receiver includes a matched filter stage 920 including $m=2^{L-1}$ matched filter components 921 to 922, and a recovery circuit 930 adopting the Viterbi algorithm. In FIG. 9, the operations of an antenna, a frequency down converter 910 and a selective filter 911 are the same as those of FIGS. 1 and 2, and thus redundant descriptions will be omitted.

The receiver of FIG. 9 performs the Viterbi algorithm to maximize the branch metric BM(n) of an n-th bit stream by using the outputs of the $2^{L-1}$ matched filters. The operation principle of the MLSE recovery circuit 930 based on the Viterbi algorithm may be represented by Equation 3 below:

$$BM(n) = Re \sum_{k=0}^{2^{L-1}-1} r_{k,n} a_{k,n}^* \quad (3)$$

where $r_{k,n} = \int_{-\infty}^{\infty} r(t) h_k(t-nT) dt$, $k=0, 1, \ldots, 2^{L-1}-1$ refers to the outputs of the matched filters.

When BT is 0.5 as in Bluetooth Classic and Bluetooth Smart, almost all signal energy is transmitted during a first pulse $h_0(t)$, and thus the received signal r(t) may be approximated by Equation 4 below:

$$r(t) \cong \sum_n \alpha_{0,n} h_0(t-nT) + n(t) \quad (4)$$

Furthermore, the branch metric BM(n) of the n-th bit stream for the Viterbi algorithm may be represented by Equation 5 below:

$$BM(n) = Re(r_{0,n} \alpha_{0,n}^*) \quad (5)$$

where Re( ) refers to a real part, and $r_{0,n} = \int_{-\infty}^{\infty} r(t) h_0(t-nT) dt$ refers to the outputs of the matched filters for the first pulse.

Accordingly, in the cases of Bluetooth Classic and Bluetooth Smart, implementation can be made by using a single matched filter and the Viterbi algorithm, and a reduction in performance is not great. However, according to Laurent's decomposition, a discrimination value $a_{0,n}$ used for the recovery of symbols by the receiver of FIG. 9 may be represented by Equation 6 below:

$$a_{0,n} = e^{j\pi h \sum_{k=0}^{n} \alpha_k} \quad (6)$$

The value $a_{0,n}$ used for the calculation of the branch metric for the Viterbi algorithm is obtained by multiplying a value, obtained by accumulating transmission data $\alpha_k$, and the modulation index h. Accordingly, in the case where a modulation index error between the transmitter and the receiver is large, a problem arises in that as the length of the transmission data increases, the errors of the calculated branch metric are accumulated and increase. As a result, a reduction in the performance of the receiver increases, the conventional GFSK MLSE receiver requires accurate modulation index estimation.

Furthermore, in view of the fact that variations in modulation index allowed in the Bluetooth Classic standard range from 0.28 to 0.35 and variations in modulation index allowed by the Bluetooth Smart standard range from 0.45 to 0.55, it may be said the conventional GFSK MLSE receiver absolutely requires accurate modulation index estimation.

Figure 3:
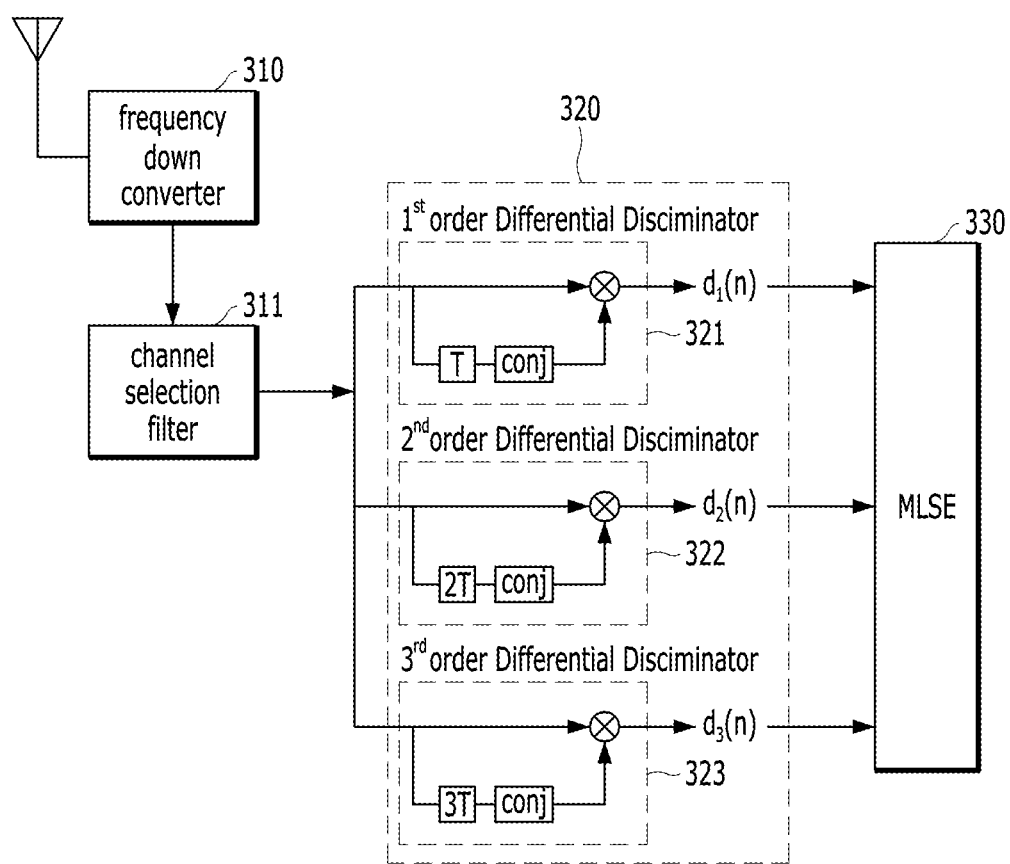
FIG. 3 is a detailed diagram showing a receiving device according to an embodiment of the present invention.

FIG. 3 is a detailed diagram showing a receiving device according to an embodiment of the present invention.

Since detailed descriptions of an antenna, a frequency down converter 310 and a selective filter 311, i.e., the front-end circuit of FIG. 3, overlap descriptions given in conjunction with FIG. 2, they will be omitted.

The first order differential discriminator 321 of a discriminator stage 320 according to an embodiment of the present invention may obtain the complex conjugate of a baseband signal and the complex conjugate of a signal obtained by delaying the baseband signal by one symbol interval, and may multiply the complex conjugates. The second order differential discriminator 322 of the discriminator stage 320 may obtain the complex conjugate of the baseband signal and the complex conjugate signal of a signal obtained by delaying the baseband signal by two symbol intervals, and may multiply the complex conjugates. Accordingly, the N-th order differential discriminator of the discriminator stage 320 may obtain the complex conjugate of the baseband signal and the complex conjugate of a signal obtained by delaying the baseband signal by N symbol intervals, and may multiply the complex conjugates.

The conventional differential discriminator obtains the complex conjugates of a baseband signal and a signal obtained by delaying the baseband signal, multiplies the complex conjugates, and outputs only the real or imaginary parts of output values. In contrast, the recovery circuit 330 of the present invention may use both the real and imaginary parts of the output values of the plurality of differential discriminators 321 to 323 for the calculation of the internal branch metrics of the Viterbi algorithm, i.e., an MLSE technique. That is, the recovery circuit 330 uses both the real and imaginary parts of the output values of the first order, second order, . . . , N-th order complex differential discriminators 321 to 323 as the inputs of the Viterbi algorithm.

The highest number of orders of the complex differential discriminators 321 to 323 that will be used in a receiving device according to an embodiment of the present invention may be determined in accordance with the BT product of a GFSK Gaussian filter.

When the length of the Gaussian filter is determined based on the BT product of the Gaussian filter, the highest number of orders of the complex differential discriminators 321 to 323 is determined in accordance with the length of the Gaussian filter. For example, when the length of the Gaussian filter is L, first order, second order, . . . , L-th order complex differential discriminators are required. In the cases of Bluetooth Classic and Bluetooth Smart, BT=0.5, in which case 99.999% or more of the energy of the Gaussian filter is concentrated within 3 symbols. Accordingly, when the MLSE technique is applied using first order, second order and third order complex differential discriminator output values, the performance desired by a user can be obtained. That is, when BT=0.5, the highest number of orders of complex differential discriminators is 3, and thus the discriminator stage 320 may be configured to include the first order complex differential discriminator 321, the second order complex differential discriminator 322, and the third order complex differential discriminator 323, as shown in FIG. 3.

Furthermore, the number of states of the Viterbi algorithm is also influenced by the length of the Gaussian filter. When the length of the Gaussian filter is L, the states of the Viterbi algorithm may be represented by using L−1 memories, and thus $2^{L-1}$ states are present. In the cases of Bluetooth Classic and Bluetooth Smart, the length of the Gaussian filter is 3, and thus $4=2^{3-1}$ states may be constructed and then the Viterbi algorithm may be applied.

The case where the BT product of the Gaussian filter is 0.5, as in Bluetooth Classic and Bluetooth Smart, is described below. When the BT product of the Gaussian filter is 0.5, the length of the Gaussian filter correspond to 3 symbols, and thus first order, second order and third order complex differential discriminators are required. Accordingly, the receiving device includes first order, second order and third order complex differential discriminators and an MLSE component, as shown in FIG. 3.

Assuming that the n-th outputs of the first order, second order and third order complex differential discriminators are $a_1(n)$, $a_2(n)$ and $a_3(n)$, respectively, the n-th branch metric of the Viterbi algorithm, i.e., an MLSE technique, may be represented by Equation 7 below:

$$BM(n)=(d_1(n)-e^{j\pi h\alpha_n})^2+(d_2(n)-e^{j\pi h(\alpha_n+\alpha_{n-1})})^2+(d_3(n)-e^{j\pi h(\alpha_n+\alpha_{n-1}+\alpha_{n-2})})^2 \quad (7)$$

where h is a modulation index, and $a_n$, $a_{n-1}$ and $a_{n-2}$ are n-th, (n−1)-th, and (n−2)-th transmission data, respectively, and have a value of +1 or −1.

In particular, when the modulation index is 0.5, as in Bluetooth Smart, the n-th branch metric of the Viterbi algorithm may be represented by Equation 8 below:

$$BM(n)=(d_1(n)-j\alpha_n)^2+(d_2(n)+\alpha_n\alpha_{n-1})^2+(d_3(n)+j\alpha_n\alpha_{n-1}\alpha_{n-2})^2 \quad (8)$$

For an arbitrary modulation index, the n-th branch metric of the Viterbi algorithm is constructed by using both the real and imaginary parts of the outputs of the complex differential discriminators. In contrast, for the case where the modulation index is 0.5, the n-th branch metric of the Viterbi algorithm may be simply constructed by using any one of the real and imaginary parts of the outputs of the complex differential discriminators as an exception.

Figure 4:
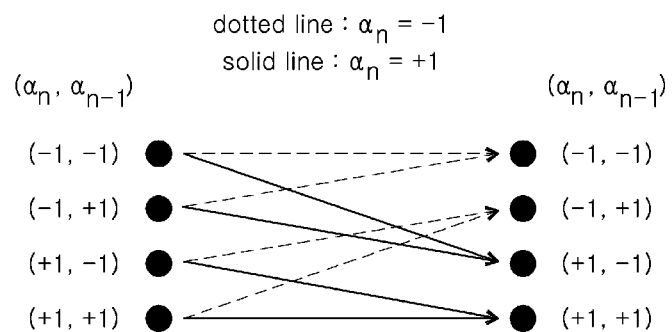
FIG. 4 is a view showing a trellis state transition diagram of the Viterbi algorithm.

In this case, the Viterbi algorithm includes 4 states, and the transition of a state attributable to a transmitted data value may be illustrated as shown in FIG. 4.

FIG. 4 is a view showing a trellis state transition diagram of the Viterbi algorithm. Referring to FIG. 4, the Viterbi algorithm calculates a path metric by calculating branch metrics for 4 states whenever n-th received data is input and then accumulating the branch metrics for each of the states. Transmitted data may be recovered by performing traceback decoding from a state having the largest value among path metrics accumulated to a specific trace back length.

Figure 5:
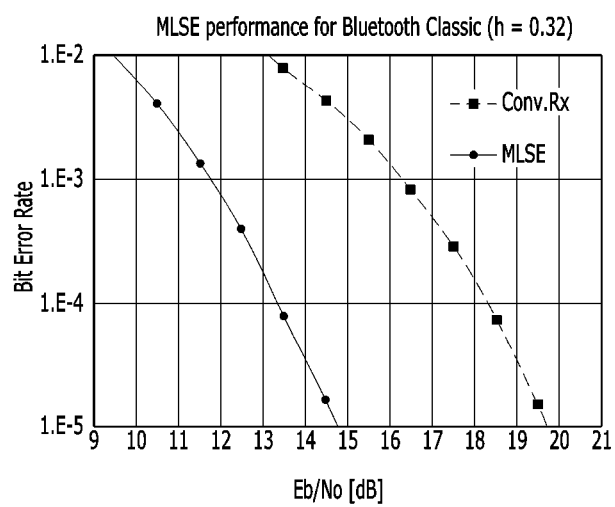
FIG. 5 is a graph showing the comparisons between MLSE receiving performance in the case of Bluetooth Classic (h=0.32) according to an embodiment of the present invention and that of a conventional receiver.

FIG. 5 is a graph showing the comparisons between MLSE receiving performance in the case of Bluetooth Classic (h=0.32) according to an embodiment of the present invention and that of a conventional receiver for determining symbols without using MLSE.

Referring to FIG. 5, in the case of the conventional receiving device not using MLSE, the SNR of signals must be maintained at a level ranging from 16 to 17 dB in order to ensure a bit error rate of 0.001. However, in the case of a new MLSE receiving device according to an embodiment of the present invention, the SNR of signals may be maintained at a level ranging from 11 to 12 dB in order to ensure a bit error rate of 0.001. Accordingly, it can be seen that the improvement of performance equal to or greater than 4 dB is achieved compared to the conventional MLSE receiving device.

Figure 6:
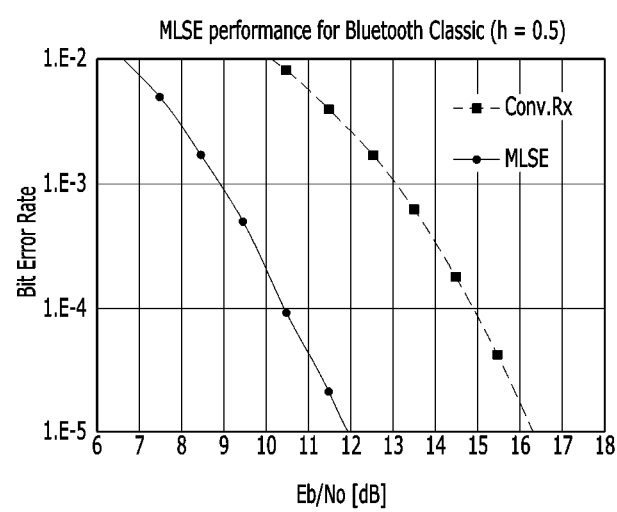
FIG. 6 is a graph showing the comparisons between MLSE receiving performance in the case of Bluetooth Smart (h=0.5) according to an embodiment of the present invention and a conventional receiver.

FIG. 6 is a graph showing the comparisons between MLSE receiving performance in the case of Bluetooth Smart (h=0.5) according to an embodiment of the present invention and a conventional receiver.

Referring to FIG. 6, the conventional receiving device must maintain an SNR of 13 dB in order to ensure a bit error rate of 0.001. In contrast, it is sufficient if the newly proposed MLSE receiving device maintains an SNR of 9 dB. Accordingly, it can be seen that the improvement of performance corresponding to 4 dB is achieved.

Figure 7:
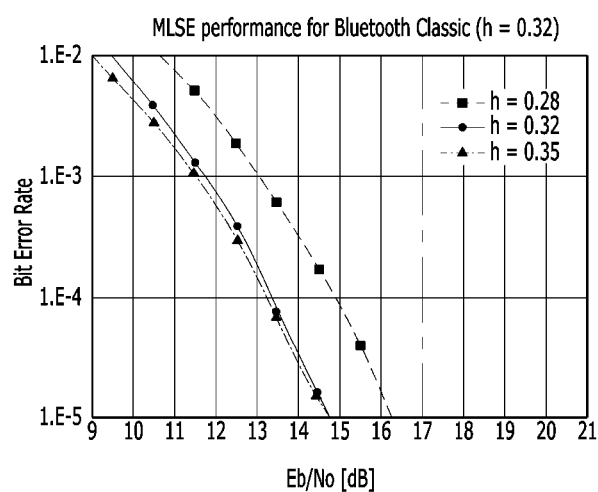
FIG. 7 is a graph showing MLSE receiving performance attributable to variations in modulation index in the range from 0.28 to 0.35 in Bluetooth Classic according to an embodiment of the present invention.

FIG. 7 is a graph showing MLSE receiving performance attributable to variations in modulation index in the range from 0.28 to 0.35 in Bluetooth Classic according to an embodiment of the present invention.

Referring to FIG. 7, the MLSE receiving device of the present invention designed to be targeted at a modulation index h of 0.35 must maintain an SNR of 11.5 dB in order to achieve a bit error rate of 0.001. Meanwhile, when a signal is transmitted at h=0.32 due to a variation in modulation index, the MLSE receiving device of the present invention must maintain an SNR of 11.7 dB in order to achieve a bit error rate of 0.001, and thus a reduction in performance is negligible. When a signal is transmitted at a modulation index h of 0.28, the MLSE receiving device of the present invention must maintain an SNR of 13 dB in order to achieve a bit error rate of 0.001, and thus a reduction in performance is not large. Accordingly, it can be seen that the MLSE receiving device of the present invention is robust to variations in modulation index h and can deal with an arbitrary modulation index.

Figure 8:
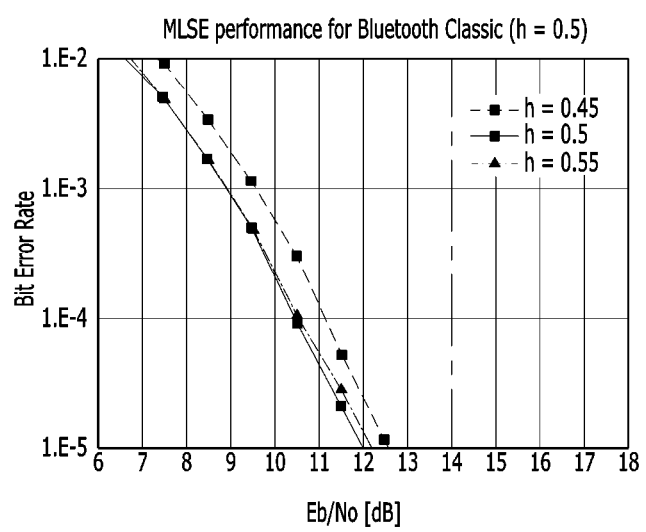
FIG. 8 is a graph showing MLSE receiving performance attributable to variations in modulation index in the range from 0.45 to 0.55 in Bluetooth Smart according to an embodiment of the present invention.

FIG. 8 is a graph showing MLSE receiving performance attributable to variations in modulation index in the range from 0.45 to 0.55 in Bluetooth Smart according to an embodiment of the present invention.

Referring to FIG. 8, it can be seen that the MLSE receiving device of the present invention exhibits performance at a modulation index h of 0.5 and performance at a modulation index h of 0.55 to the extent that they can be distinguished from each other and thus is robust to variations in modulation index, and a reduction in performance is less than 1 dB even when the modulation index varies to h=0.45.

Figure 10:
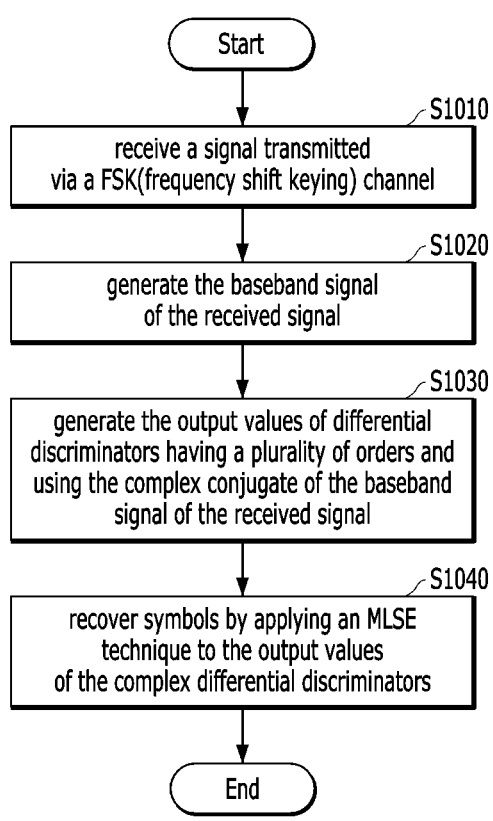
FIG. 10 is an operation flowchart showing a method of receiving a frequency-shift keying signal according to an embodiment of the present invention.

FIG. 10 is an operation flowchart showing a method of receiving a frequency-shift keying signal according to an embodiment of the present invention.

The method of receiving a frequency-shift keying signal according to the embodiment of the present invention includes step S1010 of receiving a signal transmitted via a frequency-shift keying channel, and step S1020 of generating the baseband signal of the received signal.

Thereafter, the output values of the complex differential discriminators having a plurality of orders and using the complex conjugate of the baseband signal of the received signal are generated at step S1030, and symbols are recovered by applying an MLSE technique to the output values of the complex differential discriminators at step S1040.

In this case, the output values of the complex differential discriminators may use both the real and imaginary parts of the output value of the baseband signal of the received signal.

Furthermore, the transmitted signal may pass through the Gaussian filter before passing through the frequency-shift keying channel, in which case the number of orders of the complex differential discriminators may be determined in accordance with the BT product of the Gaussian filter. Furthermore, the MLSE technique is the Viterbi algorithm, and the number of states of the Viterbi algorithm may be determined in accordance with the BT product of the Gaussian filter.

According to the present invention, the device can be implemented that recovers symbols by generating the baseband signal of a received signal transmitted via a frequency-shift keying channel and applying an MLSE technique to the first order to N-th order output values (N is a natural number equal to or larger than 2) of the plurality of complex differential discriminators using the complex conjugate of the generated baseband signal of the received signal. According to the present invention, the method and device are provided that recover symbols without estimating a modulation index at a receiver to which an MLSE technique is applied, thereby reducing the complexity of implementation.

According to the present invention, an arbitrary modulation index can be dealt with by performing MLSE by using both the real and imaginary parts of output values obtained by using the complex differential discriminators.

According to the present invention, the device for receiving a frequency-shift keying signal can be implemented that is capable of achieving the improvement of receiving sensitivity equal to or greater than 4 dB for a Gaussian frequency-shift keying signal having an arbitrary modulation index.

According to the present invention, the receiver can be implemented that has the characteristic of being robust to variations in the modulation index of a Gaussian frequency-shift keying signal without estimating a modulation index.

According to the present invention, the method and device for receiving frequency-shift keying signals can be implemented to enable Gaussian frequency-shift keying signals having different modulation indices, such as signals for Bluetooth Classic and Bluetooth Smart, to be received using the same receiver structure.

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and not only the following claims but also all equivalents to the claims and equivalent modifications should be construed as falling within the scope of the spirit of the present invention.

What is claimed is:

1. A device for receiving a frequency-shift keying (FSK) signal, the device comprising:
   a front-end circuit configured to:
      receive a signal transmitted via a frequency-shift keying channel; and
      generate a baseband signal of the received signal;
   complex differential discriminators configured to have a plurality of orders and using a complex conjugate of the baseband signal of the received signal, wherein the complex differential discriminators include at least a first order differential discriminator and a second order differential discriminator, the first order discriminator generates a first delayed complex conjugate of the baseband signal by delaying the baseband signal by a first delay, and the second order discriminator generates a second delayed complex conjugate of the baseband signal by delaying the baseband signal by a second delay; and
   a recovery circuit configured to recover symbols by applying a maximum likelihood sequence estimation (MLSE) technique to output values of the complex differential discriminators having the plurality of orders.

2. The device of claim 1, wherein each of the output values of the complex differential discriminators comprises both real and imaginary parts.

3. The device of claim 1, wherein the transmitted signal passes through a Gaussian filter before passing through the frequency-shift keying channel.

4. A device for receiving a frequency-shift keying(FSK) signal, the device comprising:
   a front-end circuit configured to:
      receive a signal transmitted via a frequency-shift keying channel, wherein the transmitted signal passes through a Gaussian filter before passing through the frequency-shift keying channel; and
      generate a baseband signal of the received signal;
   complex differential discriminators configured to have a plurality of orders and using a complex conjugate of the baseband signal of the received signal, wherein a number of orders of the complex differential discriminators is determined in accordance with a bandwidth of the Gaussian filter; and
   a recovery circuit configured to recover symbols by applying a maximum likelihood sequence estimation (MLSE) technique to output values of the complex differential discriminators having the plurality of orders.

5. The A device for receiving a frequency-shift keying (FSK) signal, the device comprising:
   a front-end circuit configured to:
      receive a signal transmitted via a frequency-shift keying channel, wherein the transmitted signal passes through a Gaussian filter before passing through the frequency-shift keying channel; and
      generate a baseband signal of the received signal;
   complex differential discriminators configured to have a plurality of orders and using a complex conjugate of the baseband signal of the received signal; and
   a recovery circuit configured to recover symbols by applying a maximum likelihood sequence estimation (MLSE) technique to output values of the complex differential discriminators having the plurality of orders, wherein: the MLSE technique is a Viterbi algorithm; and
   a number of states of the Viterbi algorithm is determined in accordance with a bandwidth of the Gaussian filter.

6. A method for receiving a frequency-shift keying(FSK) signal, the method comprising:
   receiving a signal transmitted via a frequency-shift keying channel;
   generating a baseband signal of the received signal;
   generating output values of differential discriminators having a plurality of orders and using a complex conjugate of the baseband signal of the received signal, wherein the complex differential discriminators include at least a first order differential discriminator and a second order differential discriminator, the first order discriminator generates a first delayed complex conjugate of the baseband signal by delaying the baseband signal by a first delay, and the second order discriminator generates a second delayed complex conjugate of the baseband signal by delaying the baseband signal by a second delay; and recovering symbols by applying a maximum likelihood sequence estimation (MLSE) technique to the output values of the complex differential discriminators.

7. The method of claim 6, wherein each of the output values of the complex differential discriminators comprises both real and imaginary parts.

8. The method of claim 6, wherein the transmitted signal passes through a Gaussian filter before passing through the frequency-shift keying channel.

9. A method for receiving a frequency-shift keying (FSK) signal, the method comprising:

receiving a signal transmitted via a frequency-shift keying channel, wherein the transmitted signal passes through a Gaussian filter before passing through the frequency-shift keying channel;

generating a baseband signal of the received signal;

generating output values of differential discriminators having a plurality of orders and using a complex conjugate of the baseband signal of the received signal, wherein a number of orders of the complex differential discriminators is determined in accordance with a bandwidth of the Gaussian filter; and recovering symbols by applying a maximum likelihood sequence estimation (MLSE) technique to the output values of the complex differential discriminators.

10. A method for receiving a frequency-shift keying(FSK) signal, the method comprising:

receiving a signal transmitted via a frequency-shift keying channel, wherein the transmitted signal passes through a Gaussian filter before passing through the frequency-shift keying channel;

generating a baseband signal of the received signal;

generating output values of differential discriminators having a plurality of orders and using a complex conjugate of the baseband signal of the received signal; and recovering symbols by applying a maximum likelihood sequence estimation (MLSE) technique to the output values of the complex differential discriminators, wherein: the MLSE technique is a Viterbi algorithm; and a number of states of the Viterbi algorithm is determined in accordance with a bandwidth of the Gaussian filter.

11. The device of claim 4, wherein each of the output values of the complex differential discriminators comprises both real and imaginary parts.

12. The device of claim 5, wherein each of the output values of the complex differential discriminators comprises both real and imaginary parts.

13. The method of claim 9, wherein each of the output values of the complex differential discriminators comprises both real and imaginary parts.

14. The method of claim 10, wherein each of the output values of the complex differential discriminators comprises both real and imaginary parts.

* * * * *